United States Patent [19]

Benysek

[11] 4,181,933
[45] Jan. 1, 1980

[54] MEMORY ACCESS AND SHARING CONTROL SYSTEM

[75] Inventor: Bruce M. Benysek, Herkimer, N.Y.

[73] Assignee: Mohawk Data Sciences Corp., Parsippany, N.J.

[21] Appl. No.: 897,410

[22] Filed: Apr. 18, 1978

[51] Int. Cl.² .............................................. G06F 13/00
[52] U.S. Cl. ....................................................... 364/200
[58] Field of Search ... 364/200 MS File, 900 MS File

[56] References Cited

U.S. PATENT DOCUMENTS

| | | | |
|---|---|---|---|
| 3,479,649 | 11/1969 | Bahrs et al. | 364/200 |
| 3,482,264 | 12/1969 | Cohen et al. | 364/200 |
| 3,500,329 | 3/1970 | Couleur et al. | 364/200 |
| 4,028,663 | 6/1977 | Royer et al. | 364/900 |
| 4,047,157 | 9/1977 | Jenkins | 364/200 |
| 4,054,947 | 10/1977 | Shanks et al. | 364/900 |

Primary Examiner—Gareth D. Shaw
Assistant Examiner—C. T. Bartz
Attorney, Agent, or Firm—Robert R. Hubbard

[57] ABSTRACT

An apparatus and arrangement is disclosed for controlling the sharing of an electronic memory between a number of memory users, at least one of which requires transfers of blocks of data on a high priority basis. Access to the memory is controlled by means of a modified time division multiplexing scheme whereby a set of time slots is assigned for performing memory accesses requested by high priority memory users, but, during times in which no high priority users are using the memory, these time slots may be used by other memory users in the order of pre-assigned priorities. Independent output data paths are provided for the respective high and low priority data transfers.

5 Claims, 7 Drawing Figures

MEMORY ACCESS AND SHARING CONTROL SYSTEM

BACKGROUND OF THE INVENTION

1. Field of Invention

This invention relates to electronic memory control systems and more particularly to control systems for accessing and sharing an electronic memory between a number of memory users, at least one of which requires transfers of blcoks of data on a high priority basis.

2. Prior Art

In computer systems, such as intelligent terminal systems there may be several users of the system's memory, such as CRT display terminals and printers, or any volatile terminals requiring refresh operations, which require access to the memory for transferring blocks of data on a high priority basis. The refresh operation of certain CRT display terminals, for example, requires periodic accesses to memory for reading blocks of data which represent frames of displayed character codes. These blocks of data must be read from memory and presented to the CRT display terminal on a periodic basis (for example, on the order of 40 to 70 times a second) so that the CRT may present a nonflickering display. In an arrangement for allowing such block transfers of data it is desirable to have the ability to achieve as high a data transfer rate as possible for the high priority users, without completely locking out lower priority users, such as a CPU or input-output device during the time that a data block transfer is being conducted for a high priority user.

Several methods for accessing and sharing a memory among a number of memory users are known in the art. One such method is that in which requests for accesses to memory from the various users are honored in the order in which they are received. This method is unacceptable, however, where, for example, one or more of the memory users are CRT terminals, because of the possibility that previously pending requests will cause the honoring of the requests from the CRT terminals to be delayed for an unacceptably long period of time.

In another method for accessing and sharing the memory, fast access to the memory is guaranteed to a subset of the memory users by honoring memory requests in the order of a pre-established priority scheme. Thus, for example, by granting the highest possible priority to the CRT terminals in the system, these terminals would be assured of gaining their requested accesses within a time period small enough to meet their requirements. This method suffers the disadvantage, however, of making it possible for the high priority memory users to completely "lock out" the low priority memory users from any access to memory.

A third known method for accessing and sharing a memory is that employing a time division multiplexing (TDM) scheme wherein the time available for accessing the memory is divided into a plurality of time slots and each of the time slots is assigned to servicing the memory access requests of a particular class of users. In a system with three classes of memory users, for example, a first time slot would be assigned to the first class of users, the next sequential time slot to the second class of users, the third sequential time slot to the third class of users, the fourth sequential time slot to the first class of users, and so on. An example of a system employing this method for sharing a memory is the one described in U.S. Pat. No. 3,789,367.

Time division multiplexing schemes of the type described have several disadvantages. Since memory users may gain access to memory only during the time slots assigned to their particular class, the absence of memory requests from one class of users during a particular time period results in that class' assigned time slots remaining unused, even if requests from other memory users are pending. This results in less than optimum usage of the total time available for accessing memory.

The inflexible assignment of time slots by user class can also limit the number of users within each class. For example, in the system above-described the assignment of only one cut of every three time slots to the class of high priority users could severely limit the number of members of that class. The size of the high priority class could be increased, for example, by assigning two out of every three time slots to that class. This would, however, limit the number of low priority users which could effectively be serviced.

Analogous to the problem of memory accessing and sharing is the problem of improving the data transfer rate from the memory. Thus, the retrieval of sequentially located CPU instructions from a memory on a time overlapped basis in order to improve the data transfer rate is a known technique in the prior art. For example, in the system described in IBM Technical Disclosure Bulletin, Vol. 14, No. 11, 4/72, p. 3423, the memory is arranged in two sections. The first section contains the instructions located at the even addresses of the memory, and the second section contains the instructions located at the odd addresses of the memory. Thus, if a group of instructions is located at sequential addresses of the memory, the retrieval of an instruction from a given memory section may be initiated before the completion of the retrieval of the previous instruction from the other memory section. The described system does not, however, provide for allowing memory accesses to multiple classes of memory users. Nor does it provide for preventing a first memory user from interfering with the time overlapped memory access operation of a second memory user. Moreover, the described system does not provide use of the overlapped memory access operation for non-sequential memory addresses.

It is an object of the present invention, therefore, to provide a memory accessing and sharing arrangement for allowing a first set of memory users to gain access to a memory on a high priority basis without preventing other memory users from also gaining access to that memory.

It is a further object of the invention that all of the time available for accessing the memory be utilized to service the memory access requests of a plurality of memory users.

It is a still further object of the invention to provide means for allowing a set of high priority memory users to access the memory on a time overlapped basis and to prevent any interference with this time overlapped operation by any other memory users.

BRIEF SUMMARY OF THE INVENTION

In a preferred, but nevertheless illustrative, embodiment of the present invention there is included a memory means which comprises a set of individual memories, each having independently accessible odd and even memory sections. Control of access to all of the memory sections is provided by a memory controller which employs a modified time division multiplexing scheme under which no more than 50% of the available time slots are assigned to a set of high priority memory users for accessing blocks of consecutively located data bytes in the memories. Priorities are pre-assigned to the other memory users, and they are granted access to the memories during the time slots not assigned to the high priority users in the order of their pre-assigned priorities. During times in which the high priority memory users are not actually accessing the memory, all time slots are made available for usage by the lower priority users.

The memory controller is also provided with "look-ahead" means for preventing a lower priority memory user from accessing a memory section during the time slot immediately preceding a time slot in which the same memory section is to be accessed by a high priority memory user. Interference with high priority operations by low priority users is thereby prevented.

The system further includes a high priority data bus for transferring blocks of data from the memory controller to the high priority users. Also provided is a direct memory access (DMA) bus for transferring data and control information between the memory controller and all of the memory users. Transfers of data on both of the above buses may occur simultaneously.

BRIEF DESCRIPTION OF THE DRAWINGS

The foregoing and other objects, features and advantages of the invention will be apparent from the following more particular description of a preferred embodiment of the invention, as illustrated in the accompanying drawings wherein.

DESCRIPTION OF PREFERRED EMBODIMENT

General Description of System

Memory access control apparatus embodying the present invention may be employed in any suitable data processing system in which it is desired to assign a high priority for memory access to one set of memory users and a lower priority to a second set of memory users. By way of example, however, the memory control apparatus of the present invention will be presented herein as embodied in a system wherein the set of high priority users includes one or more CRT terminals and/or printers. The set of low priority users includes a CPU and any appropriate number of peripherals or input/output units.

Figure 1:
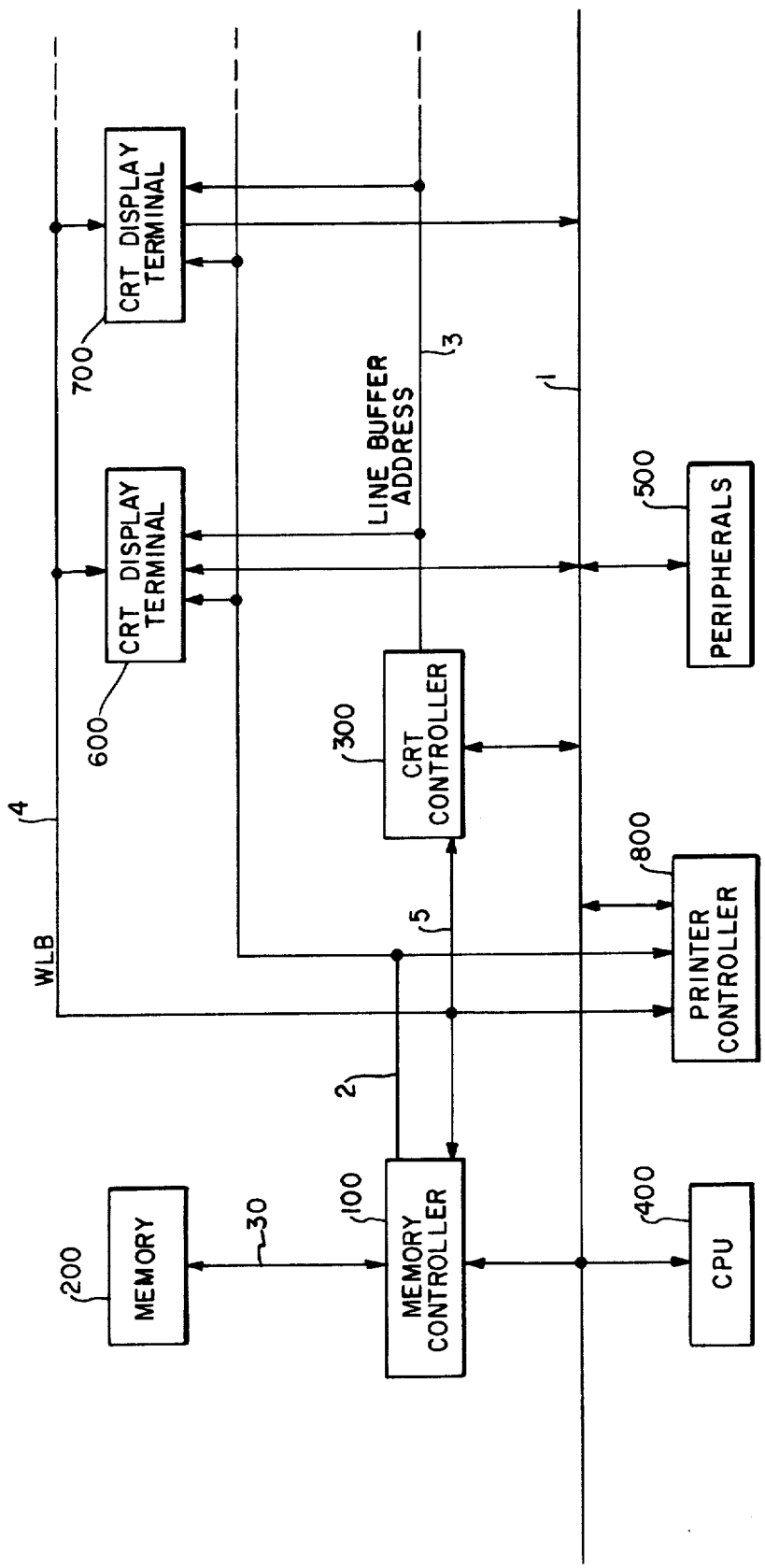
FIG. 1 is a block representation of a system in accordance with the invention.

The illustrative system shown in FIG. 1 includes a memory controller 100 which is arranged to control the time sharing of a memory means 200 by a number of high priority memory users such as CRT display terminals 600 and 700 and printer controller 800, and a number of lower priority memory users such as CPU 400 and peripherals 500. The system further includes a CRT controller 300 for controlling the operation of CRT display terminals 600 and 700 and for providing an interface between these terminals and the other units of the system.

Memory controller 100 accomplishes time sharing control by means of a number of multi-lead buses, all of which are illustrated throughout the drawings by single lines for the sake of simplicity. Memory data and control bus 30 includes a number of data leads for transferring data between memory 200 and memory controller 100 and a number of control leads, including memory address leads, which convey control signals between memory means 200 and memory controller 100 for controlling the transfer of data over the data leads. DMA bus 1 includes a number of data leads and a number of control leads, including memory address leads, which convey control signals between the various units of the system for controlling the transfer of data over the data leads therebetween. High priority data bus 2 conveys data read by memory controller 100 from memory means 200 to the one of the high priority users for which the data transfer from memory is requested. High priority control bus 5 includes control leads for conveying control signals between memory controller 100, CRT controller 300, and printer controller 800. These control signals control the timing and destination of data transfers over high priority data bus 2.

Each of CRT display terminals 600 and 700 communicates with one or more CRT monitors (not shown on the drawing). Data in the form of alphanumeric characters or other marks is displayed on each CRT surface as a frame of characters organized into character rows or lines. As mentioned previously, each CRT electron beam is deflected a periodic basis in order to present a non-flickering display. The deflection technique employed is preferably a television scanning raster, but it will be appreciated that other deflection techniques for tracing characters are usable. Each CRT display terminal includes, for each of the CRT monitors communicating with it, a line buffer register. Each line buffer register is adapted to store the character codes representing an entire line of characters in a display frame. Each CRT display terminal further includes controls adapted to display a line of characters on the CRT surface corresponding to the character codes stored in the line buffer.

CRT controller 300 includes controls for providing data to the line buffers at the appropriate times together with television raster timing and other control information so that a non-flickering display may be obtained. To perform this function, CRT controller 300 includes the ability to select the appropriate line buffer to be filled by generating an appropriate line buffer address which is transmitted to the CRT display terminals over line buffer address bus 3. CRT controller 300 also includes the ability to generate memory addresses and various control signals for initiating an access of memory which are transmitted to memory controller 100 via DMA bus 1 and high priority control bus 5. These control signals include memory read/write signals and a high priority request signal.

CPU 400, peripherals 500, and printer controller 800 also have the ability to generate the memory read/write signals and memory addresses for presentation to the memory controller via DMA bus 1. Each one of these units further includes the ability to generate a direct memory access request (DMAR). This signal is transmitted to the CPU 400. These requests are ranked in the order of their priorities by CPU 400, and a direct memory access acknowledgement (DMAA) is issued corresponding to the highest priority request present. The unit receiving the DMAA signal may then initiate a memory read/write request to memory 200 via DMA bus 1 and memory controller 100. It will be noted that CRT display terminals 600 and 700 also include the generated DMAR's and communicate with DMA bus 1 directly for operations not involving transfers of blocks of data. An example of such an operation is one in which data entered into a keyboard of one of such terminals is to be written into memory 200.

Memory controller 100 includes the ability to access the memory locations corresponding to the memory addresses associated with these memory red/white signals. Memory controller 100 divides the time during which memory 200 may be accessed into a plurality of time slots. In the illustrative embodiment of the invention described herein, the memory controller in response to a high priority read signal (defined as LLB) and its accompanying memory address, begins reading a block of data from memory 200; the location of the first byte of data in the block being specified by the aforementioned memory address. The reading of the block is accomplished by repetitively accessing memory 200 for reading two bytes of data during alternate sets of two consecutive time slots until the entire block has been read. These data bytes, which in the present embodiment may represent the characters to be stored in the line buffers of the CRT display terminals, are transferred from memory controller 100 to the appropriate CRT display terminal via high priority (H/P) data bus 2. Each time that memory controller 100 presents data on the high priority data bus 2 it also activates a write line buffer (WLB) signal which is transmitted to the line buffers via a write line buffer line 4 of H/P control bus 5. The WLB signal activates the appropriate line buffer, which had previously been selected by CRT controller 300 via line buffer address bus 3, to store the data which it receives over high priority data bus 2. It will be noted that after the address of the first byte of the data block is presented to memory controller 100 by CRT controller 300, memory controller 100 continues to read the remainder of the bytes of the data block from consecutive memory addresses without further intervention from CRT controller 300 until the LLB signal is deactivated.

As has been previously noted, memory controller 100 also has the ability to access memory 200 in response to the DMAR signals and their corresponding memory addresses generated by the low priority users and presented to the memory controller 100 via DMA bus 1. Memory controller 100 performs the memory accesses requested by these DMAR's during the time slots which are not used for performing block data transfers. Since a maximum of two out of every four time slots are utilized in performing these block transfers, the low priority memory users are prevented from being "locked out" of memory. During times when there are no high priority requests presented to memory controller 100, all time slots are available for servicing DMAR's, thus assuring most efficient memory utilization.

As previously noted, printer controller 800 is also defined as a high priority memory user. Its ability to generate high priority requests and thereby receive data via high priority data bus 2 is restricted, however, to times during which data bus 2 will not be utilized to provide data to any of the CRT dispay terminals. These times include those times in which the terminals have no need for new data from memory 200, as for example, the times during which the CRT display terminals are performing vertical retrace operations. During these times, CRT controller 300 activates a CRT DMA available line which is included in H/P control bus 5. Upon sensing the activation of this line printer controller 800 becomes enabled to present a high priority request (LLB) signal to memory controller 100. Memory controller 100 then transfers a block of data from memory 200 to printer controller 800 via high priority data bus 2 in a manner similar to that above-described for the transfer of data to the CRT display terminals.

Detailed Description

In the presently preferred embodiment of the invention, memory means 200 is a 128K memory which is comprised of four individual 32K memory units designated $M_0$ through $M_3$. It will be appreciated, however, that other embodiments of memory means 200 could be utilized without departing from the spirit and scope of the memory accessing and sharing arrangement of the present invention.

Figure 2:
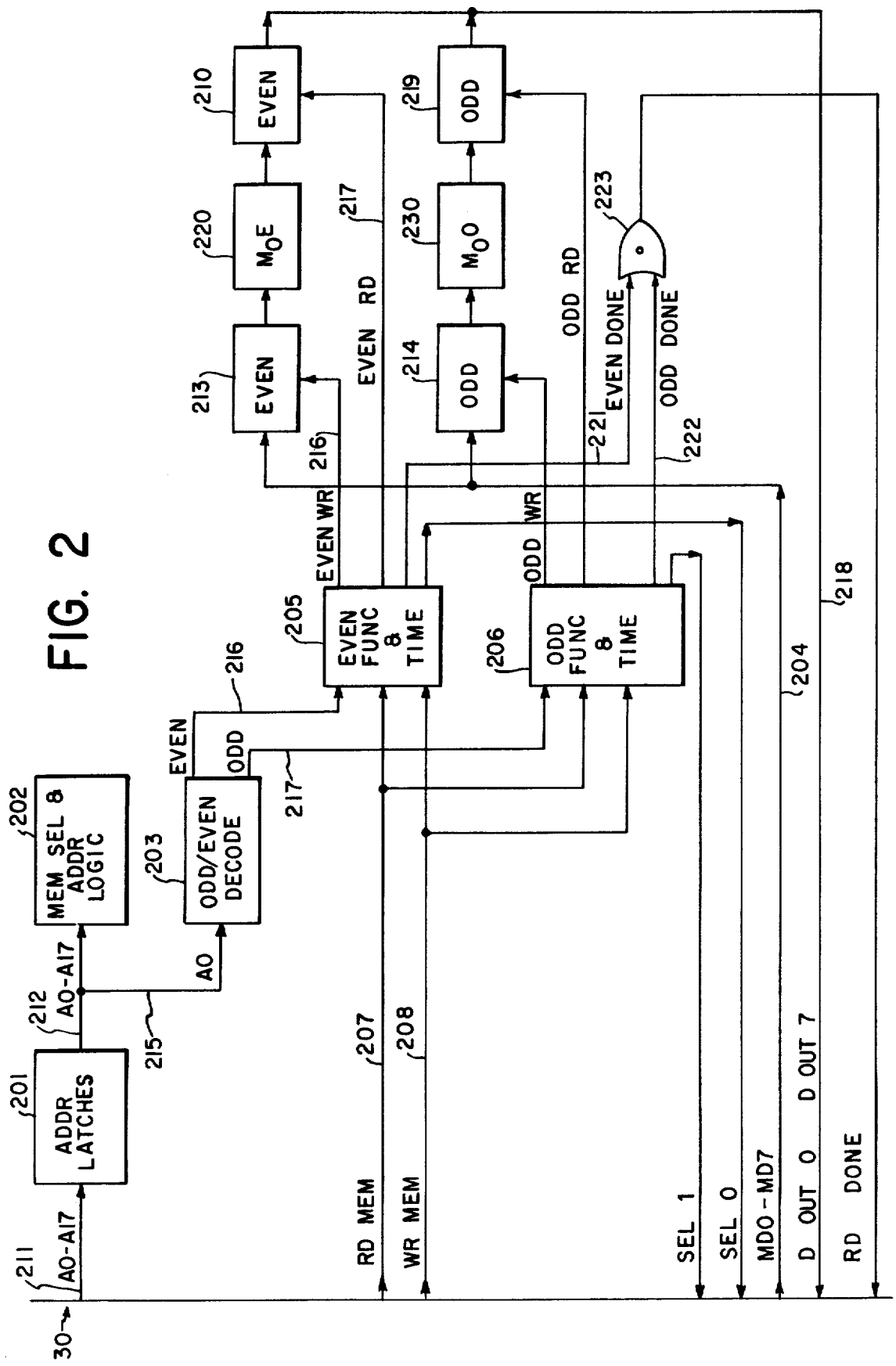
FIG. 2 is a block diagram of the memory means included in the system.

FIG. 2 illustrates only the first one of these memory units (designated $M_0$); the other memory units being substantially identical. As illustrated by FIG. 2, $M_0$ includes an even memory section 220 (designated $M_0E$) which includes all of the even numbered memory locations of $M_0$, and an odd memory section 230 (designated $M_0O$) which includes all of the odd numbered memory locations of $M_0$. Associated with $M_0E$ is a set of even data-in-latches 213 for supplying data to be written into the even locations of $M_0$, and a set of even data-out-latches 210 for receiving data read out of the even locations of $M_0$. A set of odd data-in-latches 214 and a set of odd data-out-latches 209 perform similiar functions for $M_0O$. Independent control of the flow of data into and out of $M_0E$ and $M_0O$ is accomplished by even function and timing controller 205 and odd function and timing controller 206 respectively. Selection of the proper set of even or odd function and timing controls is performed by odd-even decoder 203 which in response to the presence of a logical "0" in the low order position (A0) of address latches 201 activates even select line 216, or in response to the presence of a logical "1" in position A0 of address latches 201 activates odd select line 217.

To write data into $M_0$ or read data out of it, memory controller 100 of FIG. 1 places the address of the particular memory location to be accessed on line A0–A17 of memory address bus 211 (included in memory data and control bus 30) and specifies whether the operation is to be a read or a write by activating either a RD MEM signal on line 207 or a WR MEM signal on line 208, respectively. If the function to be performed is a write, memory controller 100 also places the data to be written into the memory location on lines MD0–MD7 of memory data-in bus 204; bus 204 also being included in memory bus 30. The address presented on memory address bus 211 is stored in address latches 201. This stored address is subsequently presented to memory select and address logic 202 via a plurality of address lines 212.

Memory select and address logic 202 includes controls which act responsively to bit positions A0, A13, and A14 of the stored address to select the appropriate memory section which is to be accessed. The remainder of the bit positions of the stored memory address are used for selecting the particular location of that memory selection from which data is to be read or into which data is to be written. Thus, if bit portions A13 and A14 of the stored address both contain logical "0's", $M_0$ is selected. As previously discussed, odd-even decoder 203 examines bit position A0 of the stored address to determine whether it contains a logical "1" or a logical "0". If a logical "1" is contained therein, odd select line 217 is activated. Conversely, if a logical "0" is contained therein even select line 216 is activated. If even select line 216 is so activated, even functions and timing controller 205 acts responsively to the states of read memory line 207 and write memory line 208 to activate either even write line 216 or even read line 217, and to generate a series of timing pulses for controlling the subsequent flow of data into or out of the selected memory section. For example, if even write line 216 is activated, the data presented by memory controller 100 on memory data-in-bus 204 is set into the even data-in-latches 213. Under the control of the aforementioned timing pulses the data in even data-in latches 213 is subsequently read into the appropriate memory location as selected by the memory select and address logic 202. If, on the other hand, the even read line 217 is activated, data is read out of the appropriate memory location and stored in even data out-latches 210 where it is presented to memory controller 100 via memory data-out-bus 218 of memory bus 30. At the same time the data is presented to memory bus 30, even function and timing controller 205 activates an EVEN DONE signal on line 221 which causes OR gate 223 to present a RD DONE signal to memory bus 30. Read and write operations under the control of odd function and timing controller 206 proceed in a similar manner utilizing the odd data-in latches 201 or the odd data-out latches 209, the RD DONE signal being similarly presented as a result of a DONE signal being activated on line 222.

The activation of even select line 215 also causes even function and timing controller 205 to activate a busy signal (SEL 0) which is presented to DMA bus 1 to indicate to memory controller 100 for preventing the initiation of any new memory accesses to $M_0OE$ from being attempted. Odd function and time controller 206 presents a similar SEL 1 signal to DMA bus 1 upon the activation of the odd select line 217 and, in a similar manner memories $M_1E$ through $M_3O$ (not shown in the drawing) present corresponding busy signals SEL 2 through SEL 7. In the presently preferred embodiment these busy signals remain active for approximately 400 nanoseconds, but other embodiments employing faster or slower memories are obviously possible in which case the duration of the busy signals would be correspondingly shorter or longer.

Figure 3:
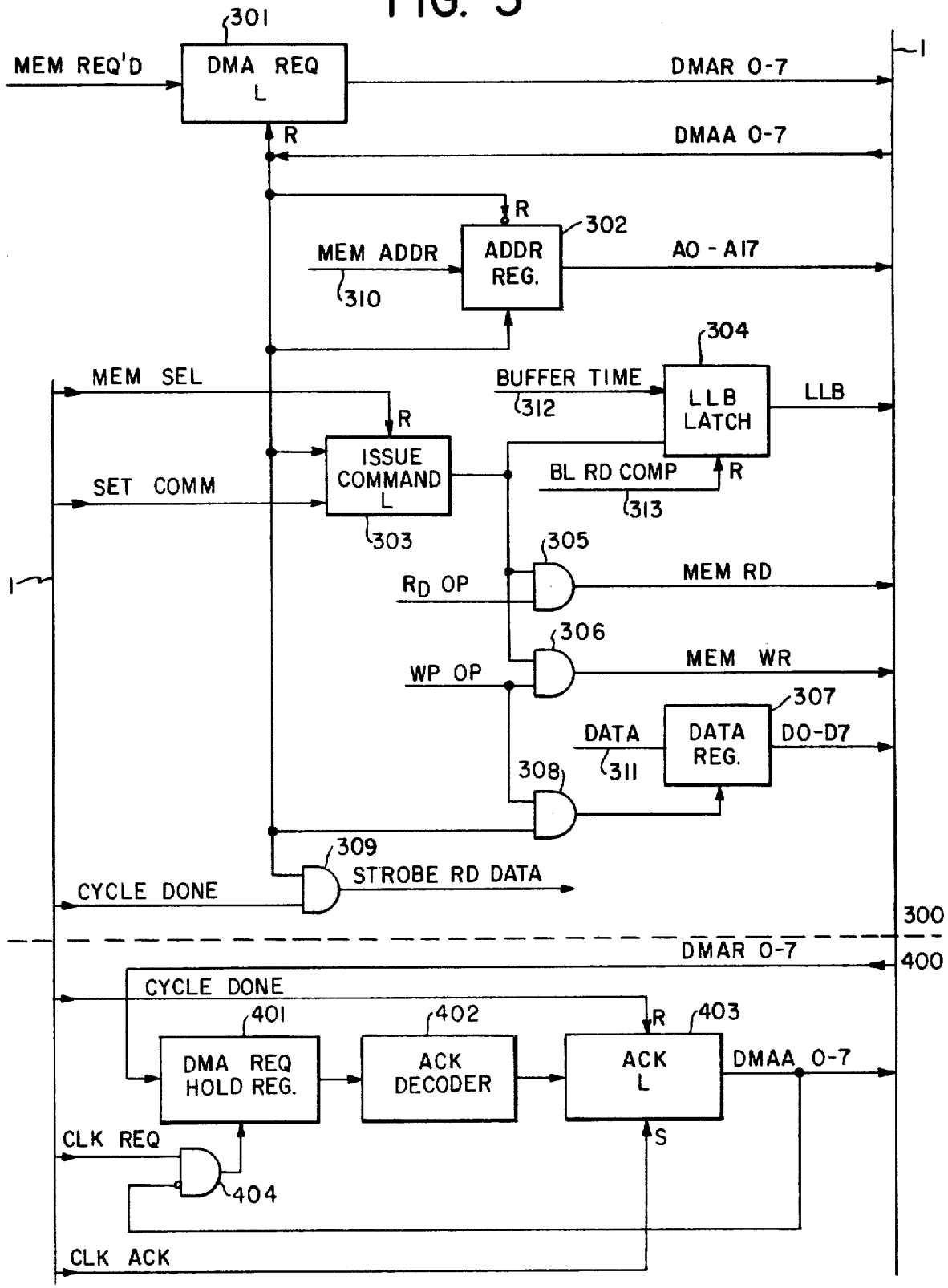
FIG. 3 illustrates a portion of the control circuitry present in a memory user and CPU of the present invention.

Referring now to FIG. 3, there is shown in block form the circuitry present in each high or low priority memory user for obtaining access to memory 200. It will be noted that the memory users are divided into eight priority classes. The CPU may obtain access to memory 200 only during those times when there are no pending requests for memory access from any of the above classes. FIG. 3 also shows, in simplified block form, the circuitry present in CPU 400 for granting access to memory in the order of the pre-established priority of the requests.

When a memory user, such as CRT controller 300, reaches a point in its operations at which an access to memory is required, it activates a memory required signal which sets a DMA request latch, such as latch 301. The output of latch 301 activates one of the eight DMA request (DMAR) lines 0-7 which are included in DMA bus 1. The highest priority request possible is DMAR 0, and this line may only be activated by the high priority memory users, such as CRT controller 300 or printer controller 800. CPU 400 senses any active DMAR signals present on DMA bus 1 and sets them into a DMA request hold register 401 upon reception of a clock request (CLK REQ) signal which is generated by memory controller 100 and passed to the CPU 400 via DMA bus 1. These latched DMAR signals are presented to acknowledgement decoder 402 which determines the highest priority request pending in DMA request hold register 401 and conditions the one of the acknowledgement latches 403 which corresponds to that request. This latch is set upon reception of a clock acknowledgement (CLK ACK) signal which is also generated by memory controller 100 and presented to CPU 400 via DMA bus 1. The setting of this latch activates the appropriate one of DMA acknowledgement (DMAA) lines 0-7 of DMA bus 1. It will be noted that while any of these DMAA lines are active, the setting of any new DMA requests into DMA request hold register 401 is prevented by gate 404.

For the purpose of illustration, the following discussion will describe the sequence of events which occurs within CRT controller 300 subsequent to its activation of the DMAR 0 line for requesting access to memory to provide data to terminals 600 and 700. It will be appreciated that the operation of the other memory users are similar to that of CRT display terminal 600.

Upon the activation of the DMAA 0 line, DMA request latch 301 is reset unless it is desired that another access to memory take place in the next consecutive memory cycle. In this case DMA request latch 301 is held in its set state by continuing to hold the memory required signal in its active state. The activation of the DMAA 0 line also causes the address of the memory location to be accessed, which is provided by known means on memory address lines 310, to be set into address register 302. The setting of this address register 302 activates the corresponding address lines A0-A17 of DMA bus 1. If the operation to be performed during the access to memory is one of writing data into the memory, the activation of the DMAA 0 line also conditions gate 308 to set into data register 307 the byte of data to be written into memory which is provided by other known means on data lines 311. The setting of this byte of data into data register 307 activates the corresponding ones of data lines D0-D7 of DMA bus 1. Subsequent to the activation of the DMAA 0 line a SET COMMAND signal, which is generated by memory controller 100 and provided to CRT controller 300 via DMA bus 1, sets ISSUE COMMAND latch 303. The output of latch 603 conditions the appropriate one of gates 305 or 306 depending upon whether the operation to be performed is that of a read of a single byte of data (DMA read) from memory, or a write of a single byte of data (DMA write) into memory respectively. Thus, if the operation to be performed is a read, the memory read (MEM RD) line of DMA bus 1 is activated, or if the operation to be performed is a write the memory write (MEM WR) line of DMA bus 1 is activated. High priority memory users such as CRT controller 300 also include a latch such as LLB latch 304 for activating a high priority request or LLB (load line buffer) signal on DMA bus 1. For high priority read operations, such as one during which a block of data from memory is to be transferred to CRT display terminal 600 via high priority data bus 2, CRT controller 300 activates a BUFFER TIME line 312. Thus, the setting of ISSUE COMMAND latch 303 causes LLB latch 304 to be set which results in the activation of the LLB signal on DMA bus 1.

Memory controller 100 acknowledges the MEM RD, MEM WR and LLB signals by returning a memory selected (MEM SEL) signal over DMA bus 1. This MEM SEL signal resets ISSUE COMMAND latch 303 which causes the deactivation of the MEM RD and MEM WR lines. LLB latch 304 remains set, however, until the CRT controller 300 signals that all of the bytes of the data block have been read by activating a block read complete (BL RD COMP) line 313 which resets LLB latch 304, thereby terminating the LLB signal. To determine the completion of the data block read operation, CRT controller 300 includes a counter (not shown in the drawing) which is incremented by one each time a byte of data of the block is read. The operation is complete when the counter reaches a value equal to the length of the block (80 in the present embodiment).

Memory controller 100 signals the completion of the DMA read or write operation requested by activating a CYCLE DONE signal. This signal activates gate 309 which, in the case of a DMA read, conditions the memory user to strobe the data read off the DMA bus 1. This cycle done signal also resets acknowledgment latches 403 of CPU 400 which causes the DMAA 0 line to be deactivated. THe deactivation of the DMAA 0 line causes address register 302 and data register 307 to be reset thereby deactivating address lines A0–A17 and data lines D0–D7 of DMA bus 1 so that DMA bus 1 is available for the next operation.

Figure 4:
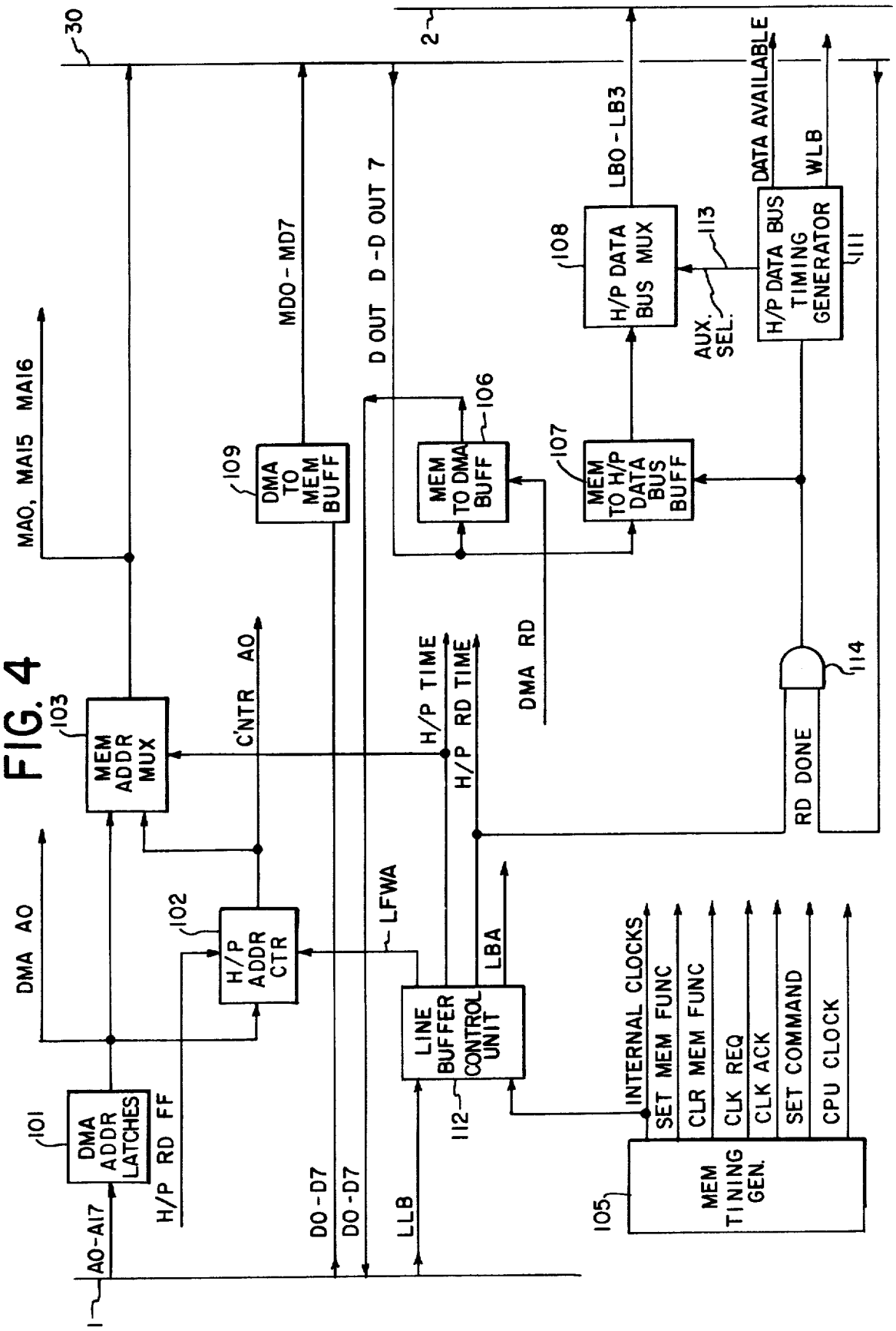
FIG. 4 is a block representation of a memory controller in accordance with the invention.

FIG. 4 shows in simplified block form a portion of the memory controller 100 of FIG. 1 comprised of the registers used for routing memory addresses and data between memory means 200 and the various memory users.

Figure 5:
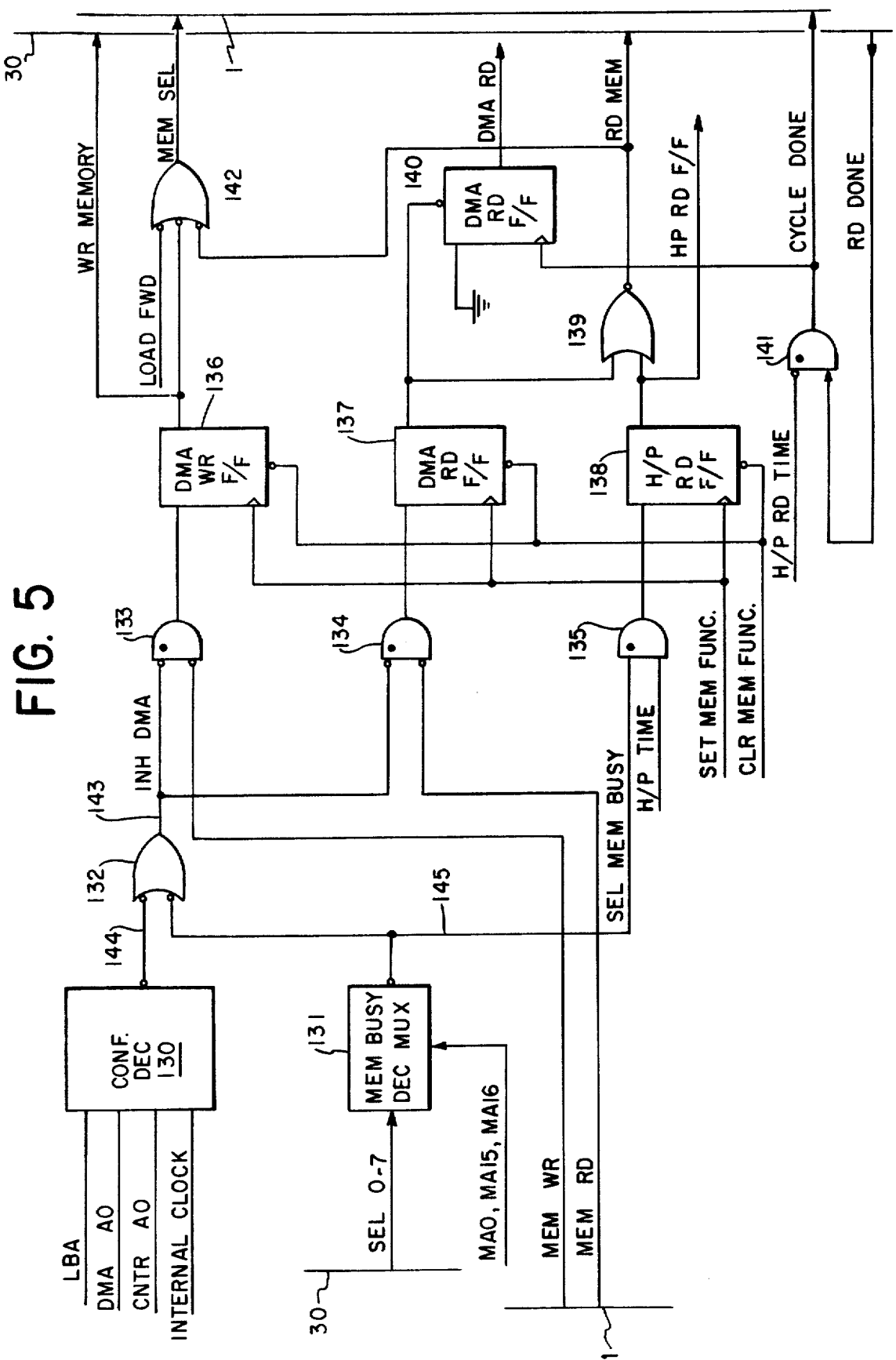
FIG. 5 illustrates a portion of the control circuitry included in the memory controller of FIG. 4.

FIG. 5 illustrates in more detail a portion of the control circuitry included in memory controller 100 for controlling the timing of the above-mentioned data and address transfers. In the following discussion of FIGS. 4 and 5, reference to FIGS. 6 and 7 which show the relationship between the various timing signals discussed, would also be useful.

As illustrated by FIG. 4, memory controller 100 includes a set of DMA address latches 101 for sensing and storing the address signals A0–A17, which, as previously discussed, are presented on DMA bus 1 by the memory user requesting access to memory in response to the appropriate DMAA signal. DMA address latches 101 feed a high priority address counter 102. If the address contained in DMA address latches 101 represents the address of the first byte of a block of data to be read by a high priority memory user, this address is loaded into high priority address counter 102 upon the activation of a load first word address (LFWA) signal. This LFWA signal is generated by line buffer control unit 112 in response to the LLB signal which, as previously discussed, is provided by the requesting user over DMA bus 1. Each time a byte of data from the block is read, the address in counter 102 is incremented by one in response to the toggling of a high priority read flip-flop 138 of FIG. 5, this flip-flop being successively set and reset once during each memory cycle in which a byte of data from the block is read.

It will be noted that the basic timing of memory controller 100 is controlled by memory timing generator 105 which, in addition to generating a set of internal clock signals, also generates a set memory function (SET MEM FUNC) signal, a clear memory function (CLR MEM FUNC) signal, a clock request (CLK REQ) signal, a clock acknowledged (CLK ACK) signal, a SET COMMAND signal, and a plurality of CPU CLOCK signals. Line buffer controller 112, in response to the LLB signal and the appropriate internal clock signals of memory timing generator 105, generates, in addition to the LFWA signal previously discussed, a H/P TIME signal, a H/P RD TIME signal and a line buffer active (LBA) signal. The time relationships between the signals is illustrated in the timing charts of FIGS. 6 and 7.

Figure 6:
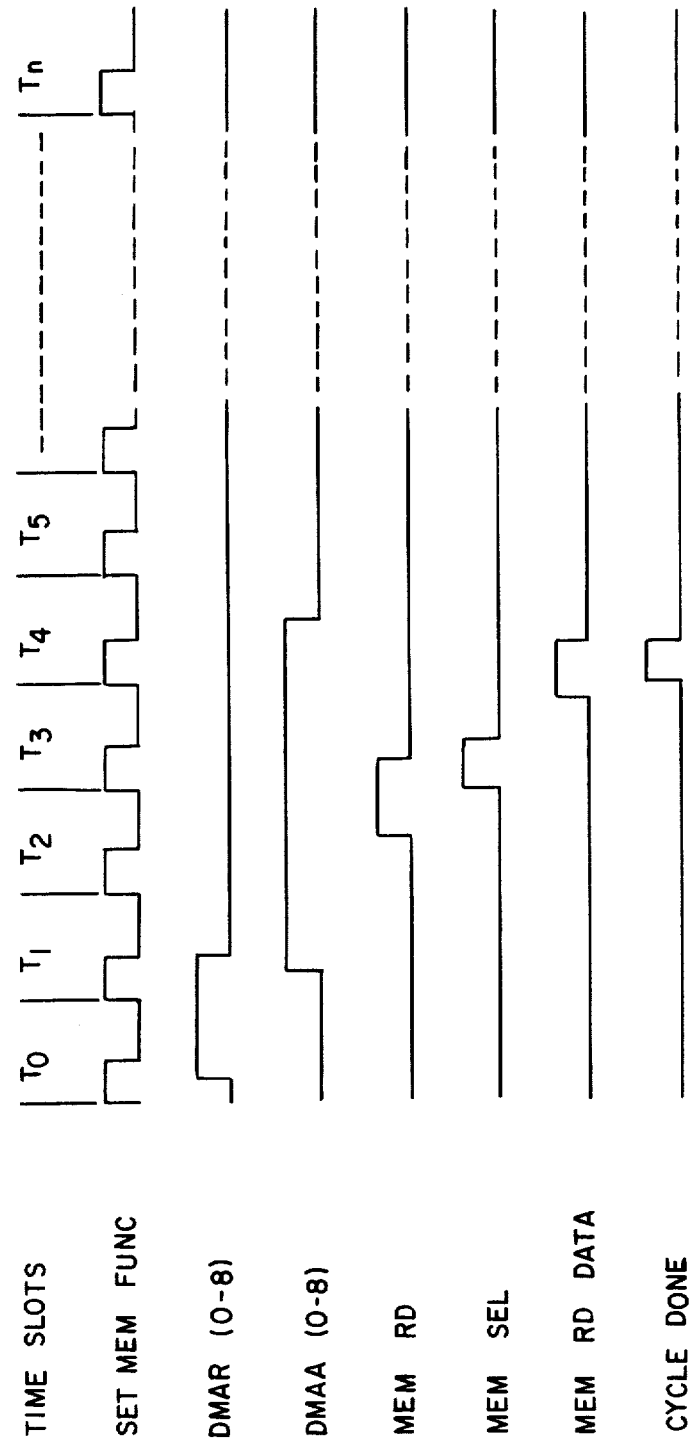
FIG. 6 is a timing chart illustrating a low priority read operation in accordance with the present invention.

Referring to FIG. 6, it will be noted that the times during which the memory means 200 of FIG. 1 may be accessed are defined by a plurality of time slots $T_0$ through $T_n$. In the present embodiment each of these time slots is 250 nanoseconds long, this period being determined by the cycle of the SET MEM FUNC signal generated by memory timing generator 105. A complete access cycle to one of the memory sections of the present embodiment takes approximately 400 nanoseconds, that section thus remaining busy or selected for a 400 nanosecond period starting at the beginning of the time slot in which it was accessed. It is possible, however, to access the memory means 200 at an effective rate of one access every 250 nonoseconds by always accessing one of the non-busy memory sections while the memory access initiated in the previous time slot is being completed. For example, if an access to the even section of memory unit 0 ($M_0E$ of FIG. 2) is initiated during $T_0$, an access to the odd memory section $M_0O$ or any sections of $M_2$ through $M_3$ may be initiated during $T_1$.

Figure 7:
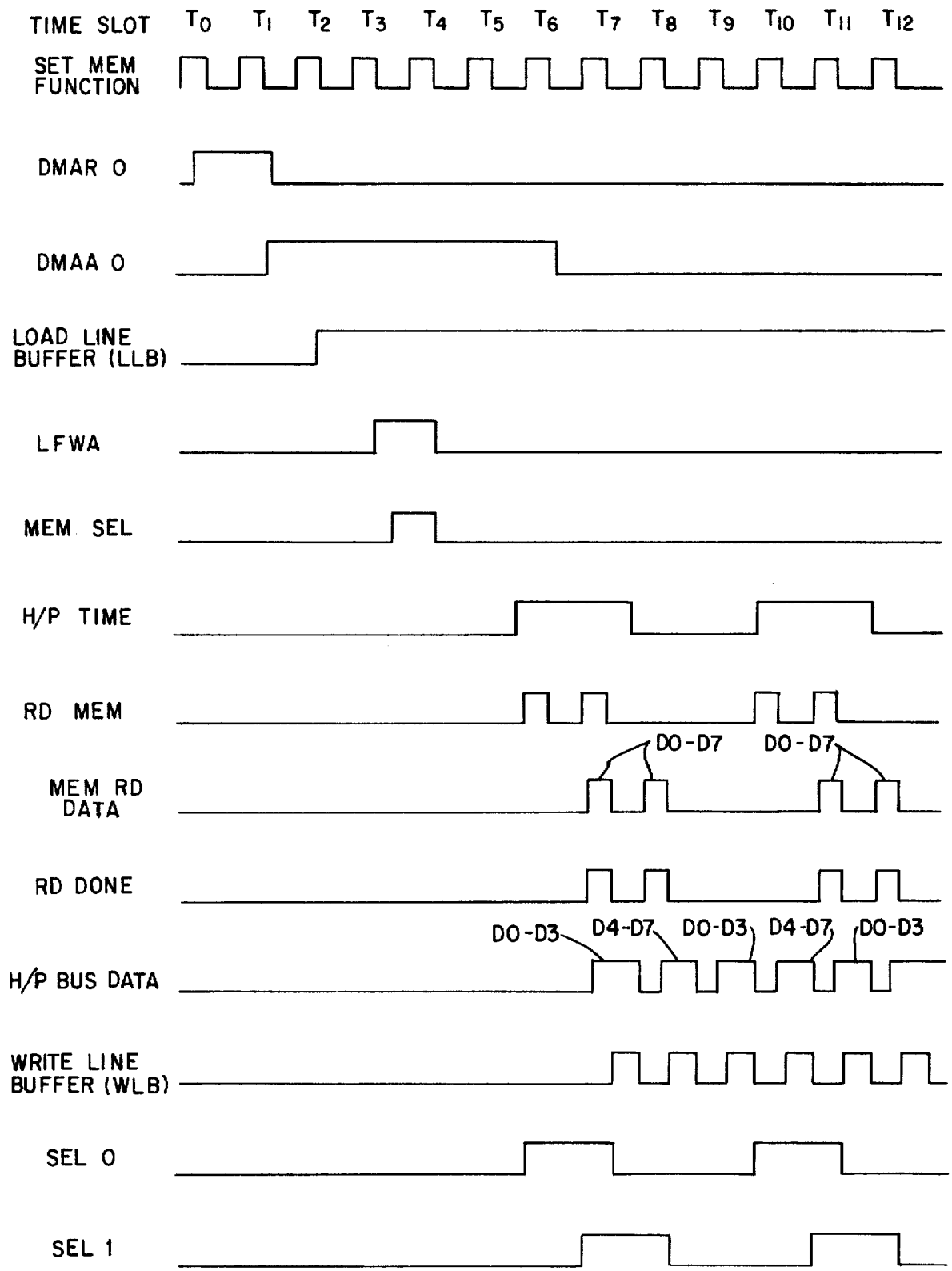
FIG. 7 is a timing chart illustrating a high priority read operation in accordance with the present invention.

Returning to FIG. 4, it will be noted that after the address of the first byte of the block of data to be read by a high priority user is transferred to high priority address counter 102, DMA address latches 101 are available for receiving the address of a memory location to which another memory user has requested access. Memory address multiplexer 103 presents either the address contained in DMA address latches 101 or that contained in high priority address counter 102 to memory bus 30. The address which is presented is controlled by the state of the H/P time signal as generated by line buffer controller 112, the address contained in high priority address counter 102 being gated through when the H/P TIME signal is in its active state. As shown in FIG. 7, during time periods in which blocks of data are being transferred to a high priority memory user via high priority data bus 2, the H/P TIME signal is active during alternating sets of two consecutive time slots. Thus, during each one of these sets of time slots, the addresses of up to two consecutive bytes of data in the block being accessed are transferred to memory bus 30. The in-between sets of time slots are available for transferring to memory bus 30 the addresses which may be contained in DMA address latches 101 as a result of requests for memory access by low priority memory users. Thus, low priority memory users are prevented from being blocked out of memory during high priority data transfers. It will also be noted from FIGS. 6 and 7 that during times when there are no high priority data transfers taking place the H/P TIME signal is not activated. During these time periods, therefore, the memory addresses which may be contained in DMA address latches 101 may be gated to memory bus 30 during all available time slots. This arrangement insures more efficient memory usage than prior art time division multiplexing arrangements in which, for example, a particular set of time slots are unconditionally dedicated to memory accesses requested by the high priority memory users.

For operations in which data is to be written into memory means 200 by a low priority user, memory controller 100 includes a DMA to memory buffer 109 which senses and stores the byte of data to be written; this byte having been presented by the memory user requesting the operation via data lines D0 through D7 of DMA bus 1, as previously discussed. The outputs of buffer 109 activate the corresponding memory data lines MD0 through MD7 of memory bus 30 which present the data to be written to the appropriate memory section, as described in the discussion of FIG. 2.

For operations of reading data out of memory, the byte of data provided by the memory on lines D OUT 0 through D OUT 7 of memory bus 30 is set into one of two registers, depending upon whether the operation is a high or low priority one. If the operation is a low priority of DMA read, the byte of data is set into a memory of DMA buffer 106 by the activation of a DMA RD line. The data in buffer 106 is subsequently presented to the requesting memory user via data lines D0 through D7 of DMA bus 1. If, on the other hand, the operation being performed is a high priority read of a block of data (signified by the presence of the H/P RD TIME signal generated by line buffer controller 112), the data received on lines D OUT 0 through D OUT 7 is set into a memory to high priority data bus buffer 107. The setting of this data into buffer 107 is controlled by gate 114 which causes the data to be set into buffer 107 upon the activation of the RD DONE signal by the memory means 200 of FIG. 2 while the H/P RD TIME signal is active. The output of gate 114 also conditions a high priority data bus timing generator 111 to produce a series of timing signals including a multiplex select (MUX SEL) signal 113, a DATA AVAILABLE signal and a write line buffer (WLB) signal. During the first activation of the DATA AVAILABLE signal by timing generator 111, MUX SEL select signal 113 activates a high priority bus multiplexer 108 to pass the low order four bits of the data contained in buffer 107 to the line buffer of the requesting high priority memory user via lines LB0 through LB3 of high priority data bus 2. During the second activation of the DATA AVAILABLE signal multiplex select signal 113 conditions high priority data bus multiplexer 108 to pass the high order four bits of the byte in buffer 107 to the requesting high priority user in the same manner. Each time data is so presented via lines LB0 through LB3 the presence of the DATA AVAILABLE and WLB signals which are passed to the high priority users via high priority control bus 5 of FIG. 1, may be used to set the data presented into the appropriate positions of the line buffer of the high priority user which requested the data.

FIG. 5 shows, in some further detail, the control circuitry included in the memory controller of the present invention. These controls include a DMA write flip-flop 136 which is set during low priority or DMA write operations, a DMA read flip-flop 137 which is set during DMA read operations, and a high priority read flip-flop 138 which is set during high priority read operations. The timing of the setting and resetting of these flip-flops is determined by the SET MEM FUNC and CLR MEM FUNC signals generated by memory timing generator 105 of FIG. 4. Since, as previously noted, the time slots available for accessing memory are determined by the timing of the SET MEM FUNC signal, the appropriately gated one of these flip-flops will be set during each time slot in which a memory access is requested. For example, assuming the inactive state of inhibit DMA line 143, the activation of the MEM WR line of DMA bus 1 causes AND gate 133 to condition DMA write flip-flop 136 to be set upon the activation of the SET MEM FUNC signal. Similarly, AND gate 134 conditions DMA read flip-flop 137 for being set upon the activation of the MEM RD line of DMA bus 1. High priority read flip-flop 138 is conditioned to be set by AND gate 135 upon this gate's sensing the activation of the H/P TIME signal line buffer controller 112 of FIG. 4. The outputs of DMA read flip-flop 137 and high priority read flip-flop 138 are combined by OR gate 139 to activate the RD MEM line of memory bus 30 which, as previously discussed, causes memory means 200 to read a byte of data from the appropriate memory location. As also previously discussed, each activation of high priority read flip-flop 138 causes the address contained in high priority address counter 102 of FIG. 4 to be incremented by one.

The setting of DMA write flip-flop 136 activates the WR MEM line of memory bus 30 which, as previously discussed, causes the memory means 200 to cause the data presented to it via memory bus 30 to be written into the appropriate memory location. The RD MEM and WR MEM signals are combined with the LFWA signal generated by the line buffer controller 112 of FIG. 4 by OR gate 142 to produce the MEM SEL signal. This signal, as previously discussed, is presented to the requesting memory user via DMA bus 1 causing that user to deactivate the previously activated MEM RD line or MEM WR line of DMA bus 1. If the operation being performed is a DMA read, the H/P RD TIME signal of line buffer controller 112 of FIG. 4 is inactive, as previously discussed. Under these conditions the activation of the RD DONE signal by memory means 200, which is presented to memory controller 100 via memory bus 30, conditions AND gate 141 to activate the CYCLE DONE line of system bus 1. At the same time, trigger 140 is set, thereby activating a DMA RD signal. The DMA RD signal causes the data presented by memory means 200 over lines D OUT 0 through D OUT 7 of memory bus 30, to be set into memory to DMA buffer 106 of FIG. 4, from which the data is presented to the requesting memory user via DMA bus 1. The activation of the CYCLE DONE line also causes the resetting of the appropriate one of acknowledgment latches 403 of CPU 400, and signals the requesting memory user that it may strobe the read data from DMA bus 1.

The memory controller of the present invention also includes means for preventing the low priority memory accesses, which are performed during those time slots which are not utilized in performing high priority memory accesses, from interfering with the high priority access operation. In a typical high priority read operation, a byte from an even section of one of memories M$_0$ through M$_3$ is read, followed by a read from the next sequential location of that memory which is located in the corresponding odd section. Since, as previously noted, the duration of a complete memory cycle is 400 nanoseconds in the present embodiment, the allowance of a low priority read of an even memory section in the time slot immediately preceding the time slot in which the high priority read of an even memory section was to take place could result in that even section being unavailable for the high priority read. This situation is prevented by conflict decoder 130 of the present invention. During the time that the LBA signal is active (indicating that a high priority read of a block of data is in the process of execution) conflict decoder 130 compares the setting of the low order position (DMA A0) of DMA address latches 101 of FIG. 4 with that of the low order position (CNTR AO) of high priority address counter 102 of FIG. 4. If the setting of these positions is the same (for example, both positions contain logical "0's" indicating even memory addresses) conflict decoder 130 is conditioned by one of the internal clock signals generated by memory timing generator 105 of FIG. 4 to activate line 144 during the time slot immediately preceding the next time slot assigned to the high priority read. The activation of line 144 conditions OR gate 132 to activate an inhibit DMA line 143 which in turn deconditions AND gates 133 and 134 thereby preventing the setting of DMA write flip-flop 136 and DMA read flip-flop 137. Thus, for example, if the block of data being read during the high priority read operation started at an even memory location, DMA reads of data from any even memory section would always be prevented during the second time slot of each set of two time slots which are available for DMA read operations. It will be appreciated, however, by practitioners of the art, that additional bit positions of DMA address latches 101 and high priority address counter 102 could be examined by conflict decoder 130 so that DMA memory accesses would only be prevented to the particular memory section which was about to be accessed during the high priority read operation.

Memory controller 100 also includes means for preventing either a DMA access or a high priority access to a memory section which is already busy. This function is performed by memory busy decoder 131 which compares the state of the memory selected signals 0 through 7 (SEL 0-7) with memory address lines MA0, MA15, and MA16 of memory address multiplexer 103 of FIG. 4. Signals SEL 0 through SEL 7 are provided by the memory means 200 via memory bus 30. If this comparison indicates that an access of a busy memory section is being attempted, selected memory busy (SEL MEM BUSY) line 145 is activated which results in the deconditioning of AND gates 133, 134 and 135. The deconditioning of these AND gates prevents the setting of DMA write flip-flop 136, DMA read flip-flop 137 and high priority read flip-flop 138 thereby preventing the requested memory access.

The operation of the present invention may be best understood by reference to the operational examples of a DMA read operation and a high priority read operation which are illustrated by the timing charts of FIG. 6 and FIG. 7, respectively.

Referring to FIG. 6, it may be seen that the periods during which memory accesses may be accomplished are divided into a plurality o time slots T$_o$ through T$_n$, each of these time slots being 250 nanoseconds long as determined by the cycle of the SET MEM FUNC signal of memory time generator 105. In the present example, the requesting memory user activates the appropriate DMAR signal during T$_0$. The corresponding DMAA signal is returned by CPU 400 during T$_1$. The activation of the DMAA signal causes the DMAR signal to be deactivated during T$_1$ and the MEM RD signal to be activated during T$_2$. Memory controller 100 responds to the MEM RD signal by returning the MEM SEL signal which causes the requesting memory user to deactivate the MEM RD signal during T$_3$. During T$_3$, memory controller 100 also initiates an access to the appropriate memory section for reading a byte of data from the appropriate memory location. It places the data read only DMA bus 1 during the latter part of T$_3$, and at the beginning of T$_4$ activates the CYCLE DONE signal in response to the activation of the RD DONE signal by memory 200. The CYCLE DONE signal conditions the requesting memory user to strobe the data from DMA bus 1 and complete the read operation. It will be appreciated that the RD DONE signal is asynchronously activated when memory 200 actually presents the data read onto memory bus 30. The completion of the read operation could thus be delayed until T$_5$, for example, if the data from memory was not available until that time.

FIG. 7 illustrates a typical high priority read of a block of data from memory by a high priority user such as a CRT terminal. In this example, the high priority user activates the DMAR 0 line of DMA 1 during T$_0$. The CPU responds by activating the DMAA 0 line during T$_1$. The activation of the DMAA 0 line causes the high priority user to deactivate the DMAR 0 line during T$_1$ and to activate the load line buffer (LLB) signal during T$_2$, the LLB signal remaining active until the entire block of data is read. The activation of the LLB signal causes line buffer controller 112 of FIG. 4 to activate the load first word address (LFWA) signal during T$_3$. THe LFWA signal causes the address of the first byte of the data block to be set into the high priority address counter 102 of FIG. 4. During T$_5$ memory controller 100 activates the CYCLE DONE signal which causes CPU 400 to deactivate the DMAA 0 line during T$_6$. During the latter part of T$_5$ line buffer controller 112 of FIG. 4 begins to activate the H/P TIME signal during alternating 500 nanosecond periods. This H/P TIME signal controls the allocation of time slots for accessing memory in response to the requests of the various memory users. Thus, in the present example, T$_6$ and T$_7$ are reserved for performing the high priority read operation, T$_8$ and T$_9$ are available for DMA read operations, T$_{10}$ and T$_{11}$ are reserved for the high priority read operation, etc. During each cycle in which the H/P TIME signal is active, memory controller 100 is conditioned to activate the RD MEM signal by the active state of the SET MEM FUNC signal. Memory means 200 responds to each RD MEM signal by presenting a byte of date to memory controller 100 via memory bus 30 and activating the RD DONE signal. For example, data is presented during T$_7$ and T$_8$ in response to the activation of the RD MEM signal during T$_6$ and T$_7$ respectively. Memory controller 100 presents the first four bits of the eight-bit data byte received during T$_7$ to the requesting memory user via high priority data bus 2 during T$_7$, the second four bits being transferred during T$_8$. The data byte received during T$_8$ is transferred to the requesting user during T$_9$ and $T_{10}$. The operation proceeds as above described until the entire 80 bytes of the data block are read.

In the above example, it should be again noted that memory 200 asynchronously activates the RD DONE signal when it actually presents the data read to memory box 30. If, for example, the first activation of the RD DONE signal on FIG. 7 did not occur until $T_8$ the WLB signals which are generated in response to the RD DONE signal would be similarly shifted to the right. This asynchronous operation makes it possible for the memory controller 100 of the present invention to be utilized in combination with memories of any speed without modification.

What is claimed is:

1. In a system having a random access memory means with a number of addressable locations, a group of low priority memory users and at least one high priority memory user and a memory controller which is operatively connected with the memory means and which is further connected with all of said users by means of a first data and control bus, each memory user including means to provide memory access signals to the memory controller to cause data to be transferred to or from the memory means; the improvement comprising:

a second data bus;

means for signalling that the memory access signals provided by the high priority user require a block transfer operation involving multiple memory accesses for a block of data; and the memory controller including:

a timing generator for generating a set of timing signals;

means responsive to said signalling means and to said timing signal set for generating a set of high priority timing signals including a high priority time signal which is periodic from the start to the completion of such a transfer of a block of data; and means responsive to the high priority time signal to access the memory means with the memory access signals of the high priority memory user during one half of the period of the high priority time signal and to transfer the accessed data to the high priority memory user via the second data bus and to access the memory means with the memory access signals of the low priority memory users (1) during the other half of the period of the high priority time signal and (2) during such time that the high priority time signal is not periodic and to transfer the data so accessed to such low priority memory users via the first data and control bus.

2. In the system according to claim 1, further comprising:

means in each of said memory users for actuating one of a group of request signals through said first data and control bus, each of said request signals uniquely corresponding to a preassigned priority;

means responsive to the highest priority one of said actuated request signals for activating a corresponding one of a group of acknowledgment signals through said first data and control bus;

means included in each of the memory users responsive to the corresponding acknowledgment signal to cause the associated memory access signal means to provide said memory access signals to the memory controller via the first data and control bus; and means operative subsequent to the activation of the acknowledgment signal corresponding to said high priority user to enable said signalling means to become operative in the event the requested memory access involves a block transfer.

3. In the system according to claim 2, wherein the set of timing signals defines a sequence of consecutive time slots and the period of the high priority time signal includes first, second, third and fourth such time slots; and said memory access means being operative to access a memory location during each such time slot so that a maximum of four memory locations may be accessed during each period of the high priority time signal.

4. In the system according to claim 3, wherein the memory means includes one or more memories each including an odd and an even section, each section being independently addressable;

wherein the memory access signals provided by the high priority user select one of the memories to be accessed and the location of the starting access for a block transfer operation;

said memory accessing means utilizing the high priority user memory access signals to access first and second memory locations from odd and even sections of a selected memory during said first and second time slots, respectively, and utilizing the low priority user memory access signals to access at least one location of one of the memories during the third or the fourth time slots; and the memory controller further including means for inhibiting during the fourth time slot the accessing of an odd or an even memory section which is to be accessed during the next succeeding first time slot for the high priority block transfer operation.

5. The system according to claim 4, further comprising:

means in each of said memory sections responsive to the initiation of an access thereto by said memory controller for activting a busy signal uniquely corresponding thereto, said busy signal being deactivated upon completion of said access thereto; and means in said memory controller responsive to each of said busy signals for preventing the accessing of a corresponding one of the memory sections if the memory access signals presented by one of said high priority or low priority memory users corresponds to the same one of said memory sections as does said busy signal.

* * * * *